US010215885B2

(12) United States Patent
Donderici et al.

(10) Patent No.: US 10,215,885 B2
(45) Date of Patent: Feb. 26, 2019

(54) PRECISE CALIBRATION FOR GALVANIC TOOLS

(71) Applicant: Halliburton Energy Services, Inc., Houston, TX (US)

(72) Inventors: Burkay Donderici, Houston, TX (US); Ferhat Turker Celepcikay, Missouri City, TX (US); Luis Emilio San Martin, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 107 days.

(21) Appl. No.: 15/301,204

(22) PCT Filed: May 29, 2015

(86) PCT No.: PCT/US2015/033191
§ 371 (c)(1),
(2) Date: Sep. 30, 2016

(87) PCT Pub. No.: WO2016/195630
PCT Pub. Date: Dec. 8, 2016

(65) Prior Publication Data
US 2018/0188414 A1 Jul. 5, 2018

(51) Int. Cl.
*G01V 3/00* (2006.01)
*G01V 13/00* (2006.01)
(Continued)

(52) U.S. Cl.
CPC .............. *G01V 13/00* (2013.01); *E21B 49/00* (2013.01); *G01V 3/20* (2013.01)

(58) Field of Classification Search
CPC . G01V 13/00; G01V 3/02; G01V 3/20; G01V 3/28; G01V 3/38; G01V 3/18; G01V 3/22; G01V 3/24; G01V 3/26; G01V 3/30; G01V 3/10; G01V 3/265; G01V 3/04; G01V 3/06; G01V 3/104; G01N 27/223; G01N 33/246; G01R 27/18; G01R 27/20;
(Continued)

(56) References Cited

U.S. PATENT DOCUMENTS 6,353,322 B1* 3/2002 Tabarovsky ............ G01V 3/20
324/358
2006/0238202 A1* 10/2006 Gorek .................... G01V 3/20
324/373
(Continued)

FOREIGN PATENT DOCUMENTS

WO WO-2015012870 A1 1/2015

OTHER PUBLICATIONS

"French Application Serial No. 1653281, Office Action dated Jul. 4, 2016", 1 pg.
(Continued)

Primary Examiner — Thang X Le
(74) Attorney, Agent, or Firm — Gilliam IP PLLC

(57) ABSTRACT

Calibration tools and procedures that provide calibration to galvanic tools can include use of measurement tools to measure resistivity of a calibration box. The resistivity of the calibration box can also be measured by a galvanic tool of interest. The two sets of measurements can be used to calibrate the galvanic tool. Additional apparatus, systems, and methods are disclosed.

21 Claims, 10 Drawing Sheets

(51) Int. Cl.
*E21B 49/00* (2006.01)
*G01V 3/20* (2006.01)

(58) Field of Classification Search
CPC ............ G01R 31/2621; G01R 31/2623; G01R 31/275; G01R 31/2884; G01R 31/2608; G01R 31/2614; G01R 31/2607; G01R 31/31924; G01R 31/3004; G01R 31/03
See application file for complete search history.

(56) References Cited

U.S. PATENT DOCUMENTS

| 2011/0156710 | A1 | 6/2011 | Wang |
| 2013/0234718 | A1 | 9/2013 | Li et al. |
| 2013/0257436 | A1 | 10/2013 | Bittar et al. |
| 2014/0368200 | A1 | 12/2014 | Wang et al. |
| 2015/0134254 | A1 | 5/2015 | Li et al. |
| 2015/0241596 | A1* | 8/2015 | Donderici ................ G01V 3/28 324/338 |
| 2016/0091627 | A1* | 3/2016 | Donderici ................ G01V 3/24 324/366 |
| 2016/0208602 | A1* | 7/2016 | Donderici ............... E21B 47/09 |
| 2017/0090059 | A1* | 3/2017 | San Martin .............. G01V 3/24 |

OTHER PUBLICATIONS

"International Application Serial No. PCT/US2015/033191, International Search Report dated Feb. 5, 2016", 3 pgs.

"International Application Serial No. PCT/US2015/033191, Written Opinion dated Feb. 5, 2016", 7 pgs.

Borup, Kasper A, et al., "Measurement of the electrical resistivity and Hall coefficient at high temperatures", Review of Scientific Instruments, vol. 83, (Dec. 14, 2012), 7 pgs.

* cited by examiner

PRECISE CALIBRATION FOR GALVANIC TOOLS

PRIORITY APPLICATIONS

This application is a U.S. National Stage Filing under 35 U.S.C. § 371 from International Application No. PCT/US2015/033191, filed on 29 May 2015, which application is incorporated herein by reference in its entirety.

TECHNICAL FIELD

The present invention relates generally to apparatus and methods related to measurements and measurement tools.

BACKGROUND

In drilling wells for oil and gas exploration, understanding the structure and properties of the associated geological formation provides information to aid such exploration. Measurements in a wellbore, also referred to as a borehole, are typically performed to attain this understanding. The usefulness of such measurements may be related to the precision or quality of the information derived from such measurements.

Many measurement tools need calibration, including an array laterolog tool (LAT). Calibration of the LAT can be performed with the LAT connected to a calibration box (CB). The calibration box consists of a network of resistors, which simulates electrical loading of the LAT, corresponding to various formations. The resistors electrically simulate the corresponding borehole-formation impedance between all electrode pairs. Usually several different calibration boxes for different borehole-formation conditions should be designed to implement shop calibration of the LAT. Ideally, the calibration boxes should produce substantially similar results with the results obtained by using formations, where the results are apparent resistivity. Apparent resistivity is the resistivity of an electrically isotropic and homogenous region that corresponds to a measured relationship between applied current and potential difference for a given configuration of electrodes such that the apparent resistivity can be provided as a product of measured resistance and a geometric factor.

Once the LAT is connected to the calibration box, unfocussed voltages and currents ($V^{(u)}$ and $I^{(u)}$) are measured. Unfocused measurements can be focused by using a software focusing code by which focused measurements ($V^{(f)}$ and $I^{(f)}$) are obtained. By using the focused measurements calibration is performed. Such precision or quality may depend on calibration of the measurement tools.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
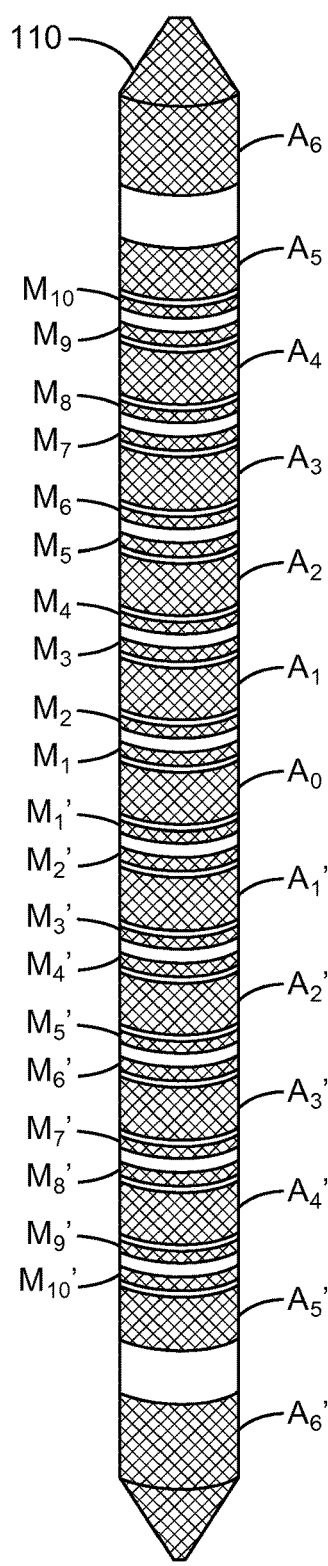
FIG. 1 is a schematic diagram of an example array laterolog tool, in accordance with various embodiments.

FIG. 1 is a schematic diagram of a LAT. LATs typically include a central electrode $A_0$ around a tool body, with current excitation electrodes $A_1$, $A_2$, ..., $A_N$, $A_1'$, $A_2'$, ..., $A_N'$ and voltage monitoring electrodes $M_1$, ..., $M_{2*(N-1)}$, $M_1'$, ..., $M_{2*(N-1)}'$ symmetrically spaced above and below the central electrode along the tool body. (The symbol * is a symbol for multiplication.) The example shown in FIG. 1 is a LAT 110 with N=6. The LAT 110 drives auxiliary currents between the current excitation electrodes $A_1, A_2, \ldots, A_N, A_1', A_2', \ldots, A_N'$ and the center electrode $A_0$ to "focus" the current from the center electrode $A_0$, i.e., to reduce propagation of the current in the direction along the tool's axis until after the current has penetrated some distance into the formation.

As taught herein, a method to calibrate a LAT, such as but not limited to the LAT 110, is presented that takes into consideration the calibration equipment. This method can be used for any galvanic tool. For the sake of simplicity, the calibration method will be described for a LAT only.

Figure 2:
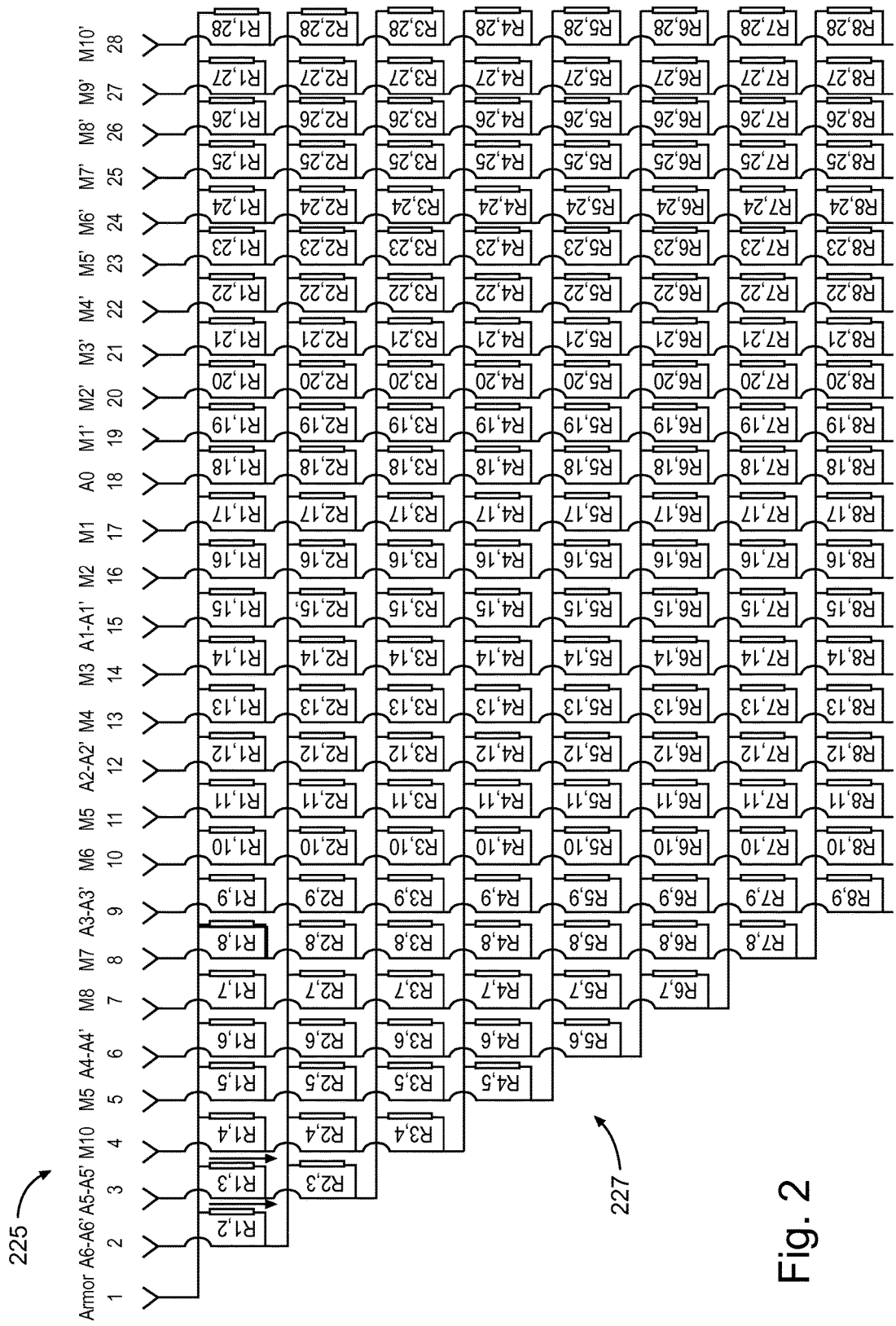
FIG. 2 is a schematic diagram of an example configuration of a calibration box for an array laterolog tool, in accordance with various embodiments.
Figure 2:
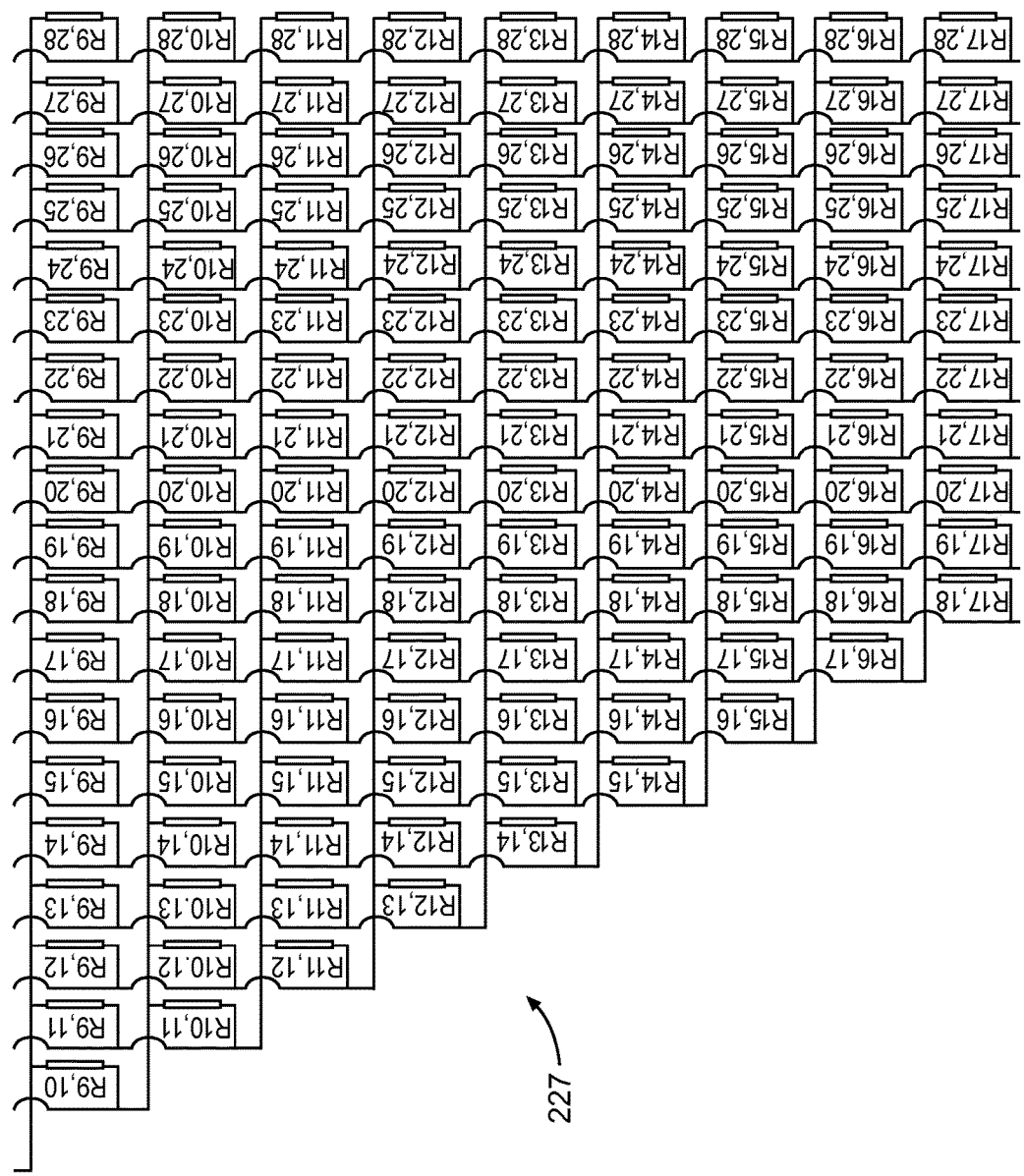
Figure 2:
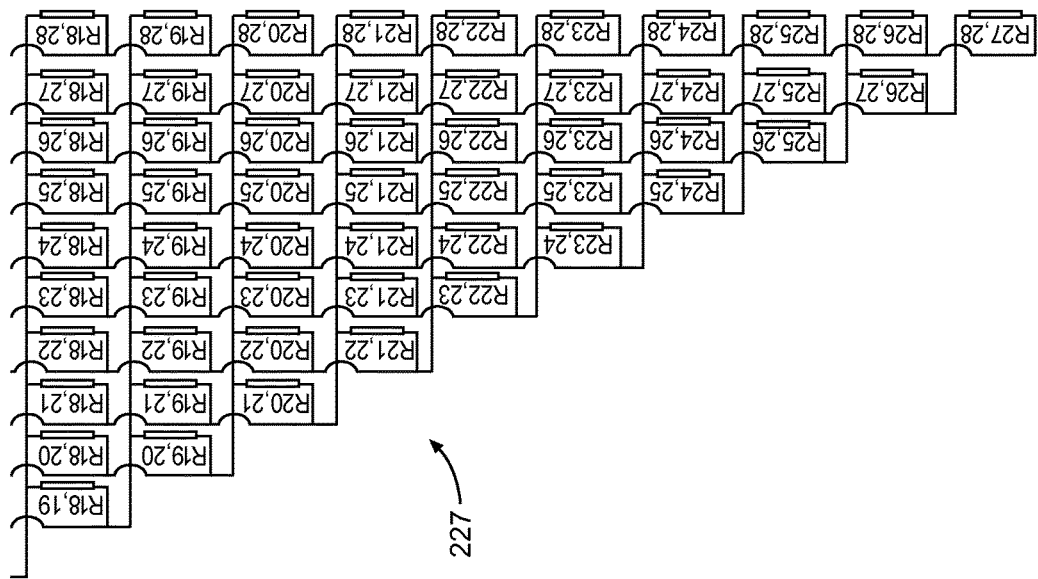

FIG. 2 is a schematic diagram of a configuration of a calibration box 225 for a LAT tool. The calibration box 225 includes a resistive network 227. This example of a calibration box can be used with the LAT 110 of FIG. 1 with N=6. It can be seen that calibration box 225 presented in this example has 28 ports. For a calibration box directed to a LAT, the number of ports can be correlated to the value of N for a given LAT. Each port of the calibration box can be connected to one of an armor, which is a reference, or corresponding electrode pairs of the LAT, that is, the armor can be connected to one port of the calibration box and each electrode pair can be connected to a different one of the ports of the calibration box. An example port assignment of the calibration box 225 is shown in FIG. 2.

Since all the excitation electrodes of the LAT are connected in pairs while all the monitor electrodes are disconnected, each of the excitation electrode pairs $A_k$-$A_k'$ (k=1, 2, 3, 4, 5, 6) is connected to a respective single port, while the symmetric monitor electrode pairs $M_L$ and $M_L'$ (L=0, 1, 2, 3, 4, 5, 6, 7, 8, 9, 10) are connected to two separate ports, respectively. $A_0$ is also connected to a single port. It can be seen that each port is connected to all the other 27 ports through the resistor network 227, resulting in total of 378 resistors in the network 227. As denoted herein, the resistor between port i and j is denoted by $R_{i,j}$. The resistor values $R_{i,j}$ only depend on the borehole and formations and should be determined in the design of the calibration box 225. The current flowing through the resistor $R_{i,j}$ is denoted by $I_{i,j}$, which has a reference direction from port i to port j (or from top to bottom of the resistor, as shown by the arrow in FIG. 2). In order to determine the resistance values of the resistors, for a given excitation current, the electrical responses of the LAT to the network 227 in a lab environment are matched to those of the tool to the formation when working in the down-hole environment. These responses can include the absolute voltage of the electrode $M_1$ with respect to the armor and the difference voltages over different monitor electrode pairs $M_1$ and $M_2$; $M_3$ and $M_4$; $M_5$ and $M_6$; $M_7$ and $M_8$; and $M_9$ and $M_{10}$.

A calibration box can be simulated to find apparent resistivities. To find a way to simulate the calibration box as if it is connected to the LAT tool is very important. This can be achieved by first creating circuit formulations and second by implementing a code to simulate the circuit formulations. By using the implemented code, unfocussed voltage values can be obtained. By using a focusing code, focused voltages and currents can be determined from the unfocused voltage and current values. Then, apparent resistivities can be calculated by using the focused voltages and currents. This method is based on ideal conditions. It assumes neither soldering effects nor coupling effects in the calibration box. In addition, the values of resistors in the calibration boxes are not exact. There is an error tolerance associated with these resistance values.

Figure 3:
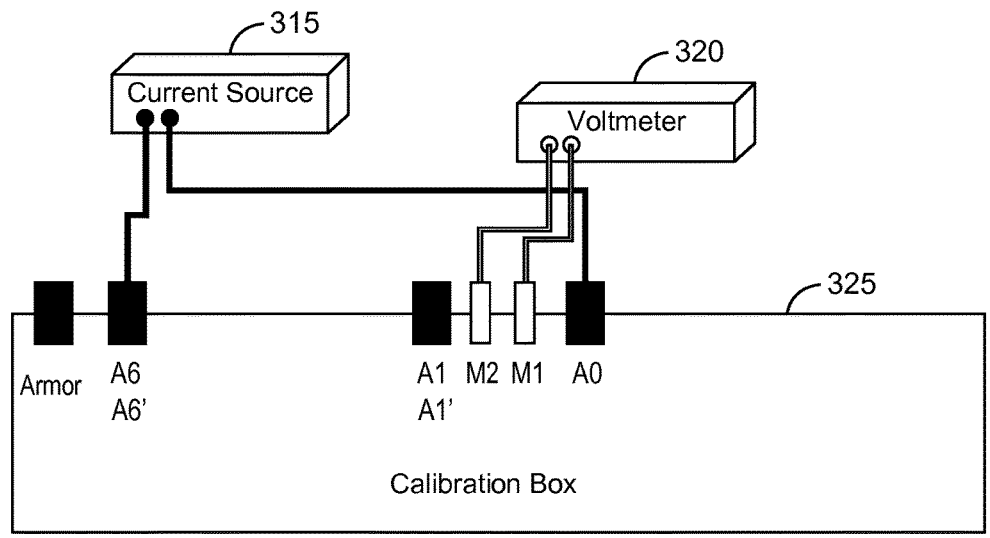
FIG. 3 is a schematic diagram of an example calibration box with connections to measure differential voltages, in accordance with various embodiments.

In various embodiments, a method can be implemented to provide a more precise mechanism to find apparent resistivities that takes into account the non-ideal effects discussed above. FIG. 3 is a schematic diagram of a calibration box 325 with connections to measure differential voltages, which also depicts how a test can be performed. Calibration box 325 can be structured similar or identical to calibration 225 of FIG. 2. This is a basic DC circuit analysis. In this test, the calibration box 325 is excited by a current source 315 rather than being excited by a LAT tool and voltage measurements are performed by using a voltmeter rather than a LAT tool. In this figure, only mode 0 of fully software focusing is presented. Herein, modes refer to particular current patterns generated.

Figure 8:
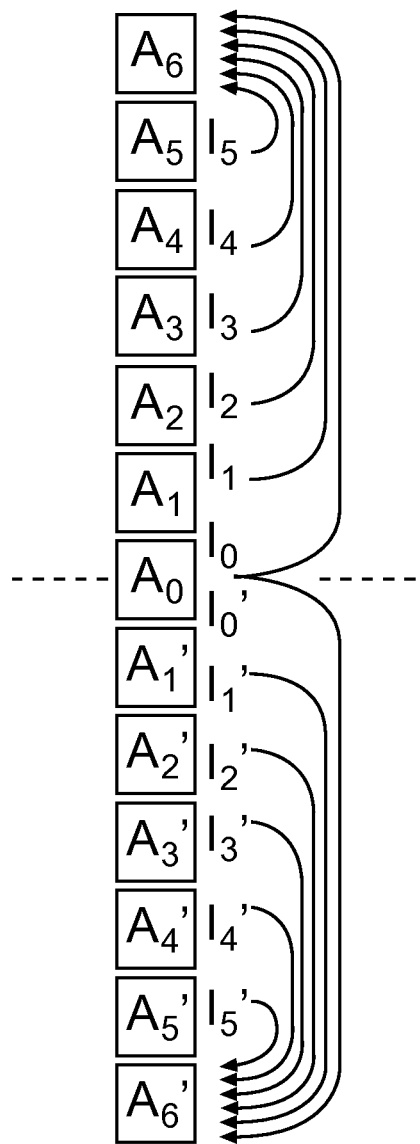
FIG. 8 is a representation of a superposition of all unfocused modes for a structure, in accordance with various embodiments.
Figure 9A:
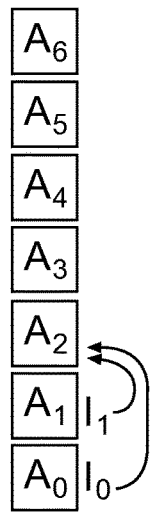
FIGS. 9A-E are representations of focused modes, in accordance with various embodiments.
Figure 9B:
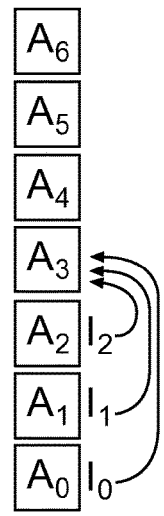
Figure 9C:
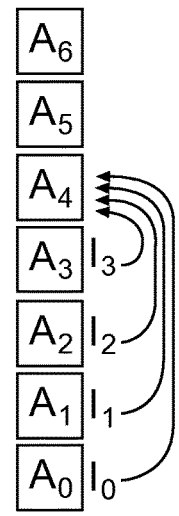
Figure 9D:
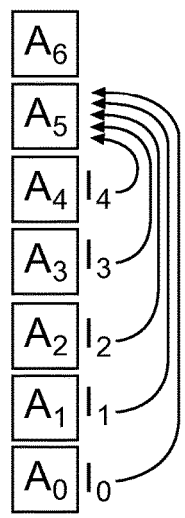
Figure 9E:
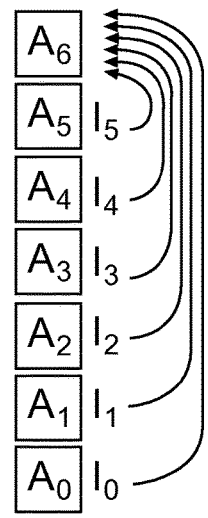

FIG. 8 is a representation of a superposition of all unfocused modes for a structure for N=6. Each pair of arrows is one mode, which makes a total of 6 modes in this case. FIGS. 9A-E are representations of focused modes. Each figure is a separate mode. For mode 1, current flows from electrode $A_0$ to electrodes $A_2$ and $A_2'$, from electrode $A_1$ to electrode $A_2$, and from electrode $A_1'$ to $A_2'$, without current being directed to flow to electrodes $A_3$, $A_3'$, $A_4$, $A_4'$, $A_5$, and $A_5'$, $A_6$, and $A_6'$. For mode 2, current flows from electrode $A_0$ to electrodes $A_3$ and $A_3'$, from electrode $A_1$ to electrode $A_3$, from electrode $A_1'$ to $A_3'$, from electrode $A_2$ to electrode $A_3$, and from electrode $A_2'$ to $A_3'$, without current being directed to flow to electrodes $A_4$, $A_4'$, $A_5$, and $A_5'$, $A_6$, and $A_6'$. For mode 3, current flows from electrode $A_0$ to electrodes $A_4$ and $A_4'$, from electrode $A_1$ to electrode $A_4$, from electrode $A_1'$ to $A_4'$, from electrode $A_2$ to electrode $A_4$, from electrode $A_2'$ to $A_4'$, from electrode $A_3$ to electrode $A_4$, and from electrode $A_3'$ to $A_4'$, without current being directed to flow to electrodes $A_5$, and $A_5'$, $A_6$, and $A_6'$. For mode 4, current flows from electrode $A_0$ to electrodes $A_5$ and $A_5'$, from electrode $A_1$ to electrode $A_5$, from electrode $A_1'$ to $A_5'$, from electrode $A_2$ to electrode $A_5$, from electrode $A_2'$ to $A_5'$, from electrode $A_3$ to electrode $A_5$, from electrode $A_3'$ to $A_4'$, from electrode $A_4$ to electrode $A_5$, and from electrode $A_4'$ to $A_5'$, without current being directed to flow to electrodes $A_6$ and $A_6'$. For mode 5, current flows from electrode $A_0$ to electrodes $A_6$ and $A_6'$, from electrode $A_1$ to electrode $A_6$, from electrode $A_1'$ to $A_6'$, from electrode $A_2$ to electrode $A_6$, from electrode $A_2'$ to $A_6'$, from electrode $A_3$ to electrode $A_6$, from electrode $A_3'$ to $A_6'$, from electrode $A_4$ to electrode $A_6$, and from electrode $A_4'$ to $A_6'$, from electrode $A_5$ to electrode $A_6$, and from electrode $A_5'$ to $A_6'$. In a downhole measurement at a drilling site, mode 1 provides the shallowest measurement probing into the formation, and so on such that mode 5 of these modes provides the deepest measurement probing into the formation.

In FIG. 3, the current source 315 is connected to port 2 ($A_6$ and $A_6'$) and port 18 ($A_0$) of the calibration box 325. A voltmeter 320 is connected to ports associated with $M_1$ and $M_2$ to measure the differential voltage $M_1$-$M_2$. Similarly, all other differential voltages can be measured by using the voltmeter 320. For mode 0, there are 10 differential voltages to measure.

All measurements may be performed at one current excitation. For example, all measurements can be performed based on 1 Amp excitation. It is expected that 1 Amp excitation can be used to achieve the best quality measurement. Note that if the current excitation used causes saturation of voltage levels, reduction in current can be made. On the other hand, in the case of a voltage reading being lower than the minimum of the voltmeter specifications, then the current can be increased. The power consumption of individual resistors in parallel can be tracked to avoid damaging the resistors due to excessive temperature values.

Steps for differential measurements may be performed in the following manner. First, a current source can be connected between $A_0$ and $A_6$ of calibration box. The current can be set to 1 A, although the current can be larger or smaller as explained above. Second, a voltmeter can be connected between $M_1$ and $M_2$ of the calibration box, and a measurement can be made. Third, the measured value can be stored in a table. Fourth, the first three steps can be repeated for all measure electrode pairs, except that $\{M_1, M_2\}$ can be replaced with $\{M_3, M_4\}$, $\{M_5, M_6\}$, . . . , $\{M_9, M_{10}\}$, $\{M_1', M_2'\}$, . . . , $\{M_9', M_{10}'\}$ one at a time. The first three steps and the repeating of the steps in the fourth step for the calibration box correlated to a LAT with N=6 results in a total of 10 measurements. Fifth, steps one through four can be repeated for different excitation electrodes by replacing $A_0$ with $A_1$, $A_2$, . . . , $A_5$ one at a time. The total number of measurements becomes a total of 10×6=60 measurements.

Figure 4:
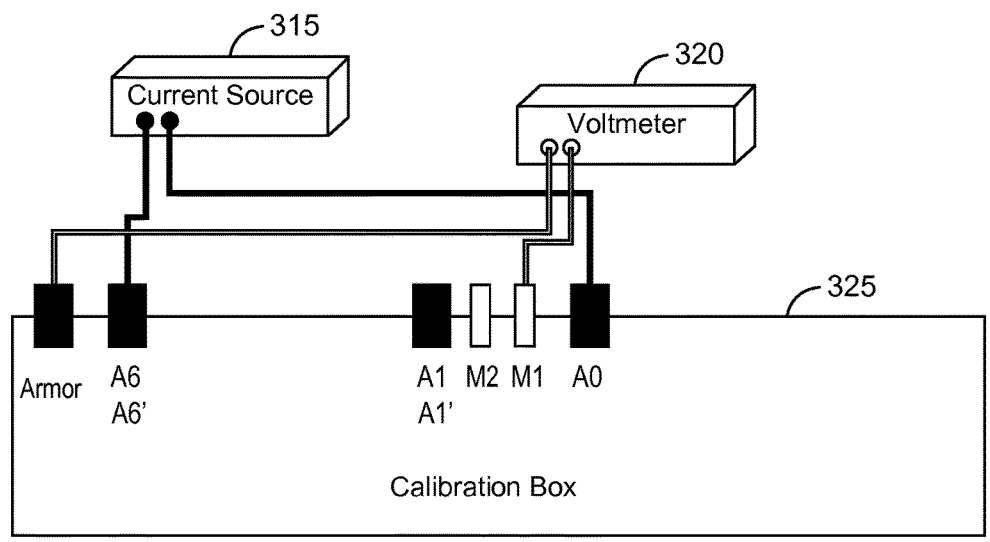
FIG. 4 is a schematic diagram of calibration box connections to measure absolute voltages, in accordance with various embodiments.

FIG. 4 is a schematic diagram of calibration box connections to measure absolute voltages. When the current source 315 and the voltmeter 320 are connected as shown in FIG. 4, the reading of the voltmeter 320 is an absolute voltage of at the port associated with $M_1$. The reading is absolute with respect to the armor that is a reference. Similarly, the absolute voltages of all ports for the other measure electrodes can be determined.

Steps for absolute measurements may be performed in the following manner. First, a current source can be connected between $A_0$ and $A_6$ of the calibration box. The current can be set to 1 A, although the current can be larger or smaller as explained above. Second, a voltmeter can be connected between $M_1$ and the armor of the calibration box and a measurement can be made. Third, the measured value can be stored in a table. Fourth, the first three steps can be repeated for all measure electrodes by replacing $M_1$ with $M_2$, $M_3, \ldots, M_{10}, M_1', \ldots, M_{10}'$ one at a time, providing a total of 20 measurements at this point in the procedure. Fifth, steps one through four can be repeated for different excitation electrodes by replacing $A_0$ with $A_1, A_2, \ldots, A_5$ one at a time. The total number of measurements becomes a total of 20×6=120 measurements.

Considering the total of differential and absolute measurements, there are 60+120=180 measurements. These measurements produce unfocussed voltages and currents. Similar to the simulation method, by using focusing code, focused voltages and currents can be determined from the unfocused voltages and currents. Then, apparent resistivities are calculated by using focused voltages and currents.

Each CB can be constructed to simulate the effects of borehole having a diameter filled with a fluid having a resistivity and a homogeneous formation outside the borehole. For example, a CB can simulate the effects of an 8-inch diameter borehole filled with a 0.1 [Ω-m] fluid with a homogeneous formation outside the borehole. The different CBs simulate formations of specific resistivities, that is, each CB can be constructed for a specific resistivity. However, the laterolog does not read the boxes at their nominal values but at the apparent values. CBs, each for a resistivity different from that of the other CBs, can be used for all five modes. Table 1 shows apparent resistivity of five CBs determined by the voltmeter test for modes 1-5.

A calibration scheme of a LAT to be used in a downhole operation can be performed in the following manner. The downhole operation can be realized with the LAT operated in a wireline logging tool or a measure-while-drilling (MWD) tool such as a log-while-drilling (LWD) tool. A voltage offset $V_0$, a current offset $I_0$, and a calibration constant C can be solved from a set of three equations that also involve the apparent resistivities from three CBs such as used in the derivation of the boxes, shown Table 1. The three equations follow from the use of three or more CBs. The equations to be solved for each mode have the following form:

$$R = C \frac{V - V_0}{I - I_0}$$

For each of the five modes of operation of the LAT, the procedure can be repeated.

Steps for coefficient calculation can be performed in the following manner. First, voltages and currents of electrodes for three calibration boxes can be read for all raw unfocused operational modes of the tool. Second, these measurements can be used as input to a software focusing algorithm to generate final focused voltages and focused currents for each of the five focused modes. For each mode i, there should be three focused voltages $V^i_1$, $V^i_2$, $V^i_3$ and three focused currents $I^i_1$, $I^i_2$, $I^i_3$. Third, the calibration coefficients for each mode of the five focused modes can be calculated. The calculation can be conducted beginning with choosing mode resistance from reference values of three CBs using Table 1, naming them as $R_1$, $R_2$, and $R_3$. Temporary values $C^i$, $V^i_0$ and $I^i_0$ can be calculated as:

$$C^i = \frac{R_1 \times (R_2 - R_3) \times I^i_1 + R_2 \times (R_3 - R_1) \times I^i_2 + R_3 \times (R_1 - R_2) \times I^i_3}{(R_2 - R_3) \times V^i_1 + (R_3 - R_1) \times V^i_2 + (R_1 - R_2) \times V^i_3}$$

-continued $$I^i_0 = \frac{R_1 \times I^i_1 \times (V^i_3 - V^i_2) + R_2 \times I^i_2 \times (V^i_1 - V^i_3) + R_3 \times I^i_3 \times (V^i_2 - V^i_1)}{(R_2 - R_3) \times V^i_1 + (R_3 - R_1) \times V^i_2 + (R_1 - R_2) \times V^i_3}$$

$$V^i_0 = \frac{R_2 \times R_3 (I^i_2 - I^i_3) \times V^i_1 + R_1 \times R_3 \times (I^i_3 - I^i_1) \times V^i_2 + R_1 \times R_2 \times (I^i_1 - I^i_2) \times V^i_3}{R_1 \times (R_2 - R_3) \times I_1 + R_2 \times (R_3 - R_1) \times I_2 + R_3 \times (R_1 - R_2) \times I_3}$$

The first-third procedures can be repeated for the remaining 5 modes.

Table 2 is an example of apparent resistivity of the CBs before and after calibration.

TABLE 1

| Calibration Box Results | Shallowest Mode 1 | Mode 2 | Mode 3 | Mode 4 | Deepest Mode 5 |
|---|---|---|---|---|---|
| Box for $R_T = 10^0$ Ω-m | 0.820621 | 1.05023 | 1.243296 | 0.970032 | 0.795631 |
| Box for $R_T = 10^1$ Ω-m | 8.793979 | 8.36109 | 8.127405 | 8.601088 | 9.431293 |
| Box for $R_T = 10^2$ Ω-m | 53.78969 | 50.02404 | 54.69983 | 76.25556 | 116.9417 |
| Box for $R_T = 10^3$ Ω-m | 71.80612 | 84.14414 | 104.0745 | 168.42 | 319.6817 |
| Box for $R_T = 10^4$ Ω-m | 64.90152 | 76.64908 | 95.35073 | 154.6906 | 292.1281 |

TABLE 2

| | Box Value | No Calibration | Calibrated | % error NoCal | % error Cal |
|---|---|---|---|---|---|
| | 1 Ωm (Cal Point #1) | | | | |
| mode 1 | 0.820621193 | 0.816853798 | 0.820621193 | 0.459090681 | 0 |
| mode 2 | 1.050229921 | 1.045775122 | 1.050229921 | 0.424173696 | 0 |
| mode 3 | 1.243295766 | 1.236381804 | 1.243295766 | 0.556099543 | 0 |
| mode 4 | 0.970031855 | 0.966716778 | 0.970031855 | 0.3417493 | 0 |
| mode 5 | 0.795631296 | 0.792704364 | 0.795631296 | 0.367875389 | 1.25586E−13 |

TABLE 2-continued

| | Box Value | No Calibration | Calibrated | % error NoCal | % error Cal |
|---|---|---|---|---|---|
| 10 $\Omega$m (Test Point #1) | | | | | |
| mode 1 | 8.793979182 | 8.665982575 | 8.537753401 | 1.455502732 | 2.91365008 |
| mode 2 | 8.36109039 | 8.3630732 | 8.231039066 | 0.023714729 | 1.555434973 |
| mode 3 | 8.127405389 | 8.179124963 | 8.197099161 | 0.636360206 | 0.857515636 |
| mode 4 | 8.601088485 | 8.611660931 | 8.543710199 | 0.122919856 | 0.667104939 |
| mode 5 | 9.431293048 | 9.442112708 | 9.429975972 | 0.114720851 | 0.013964955 |
| 100 $\Omega$m (Cal Point #2) | | | | | |
| mode 1 | 53.78969314 | 45.93968367 | 53.78969314 | 14.59389153 | 0 |
| mode 2 | 50.02404024 | 50.52270497 | 50.02404024 | 0.996850174 | 1.98856E−13 |
| mode 3 | 54.69982773 | 54.14500267 | 54.69982773 | 1.014308599 | 0 |
| mode 4 | 76.25556424 | 76.81665071 | 76.25556424 | 0.735797417 | 0 |
| mode 5 | 116.9416951 | 118.5351571 | 116.9416951 | 1.362612364 | 0 |
| 1k $\Omega$m (Test Point #2) | | | | | |
| mode 1 | 71.80612323 | 58.01013289 | 74.75949827 | 19.21283272 | 4.112984946 |
| mode 2 | 84.14414219 | 87.00521487 | 84.47255736 | 3.40020423 | 0.390300692 |
| mode 3 | 104.0745134 | 102.0141546 | 102.1463101 | 1.9796958 | 1.852714165 |
| mode 4 | 168.4200153 | 168.564021 | 166.4916489 | 0.085503894 | 1.14497461 |
| mode 5 | 319.6817061 | 323.3901675 | 321.1900889 | 1.160048047 | 0.471838946 |
| 10k $\Omega$m (Cal Point #3) | | | | | |
| mode 1 | 64.90151522 | 52.04600149 | 64.90151522 | 19.80772511 | 0 |
| mode 2 | 76.64907663 | 79.33344574 | 76.64907663 | 3.502154527 | 1.29781E−13 |
| mode 3 | 95.35073229 | 95.3959874 | 95.35073229 | 0.047461735 | 1.04326E−13 |
| mode 4 | 154.6905757 | 156.7830172 | 154.6905757 | 1.352662552 | 0 |
| mode 5 | 292.128053 | 293.538352 | 292.128053 | 0.482767397 | 0 |

The first column in Table 2 is the theoretical value, which is provided from Table 1. The second column includes apparent resistivities if no calibration is applied, whereas the third column includes those with the calibration applied. The fourth column is percent relative error of no calibration with respect to theoretical value. The fifth column is percent relative error of calibrated apparent resistivity with respect to theoretical value. Three of the five calibration boxes are used as calibration points, which are so denoted in Table 2. These calibration boxes are 1 $\Omega$m, 100 $\Omega$m and 10 k $\Omega$m calibration boxes. As expected, for the calibration points, the calibrated value and the theoretical value are equal. Thus, percent relative error is 0. In the 1 k $\Omega$m test case so denoted in Table 2, calibration works well for mode 1. The error was 19.2% before calibration. It is reduced down to 4.1% by calibration. Calibration slightly deteriorates for 10 $\Omega$m test case so denoted in Table 2.

Figure 5:
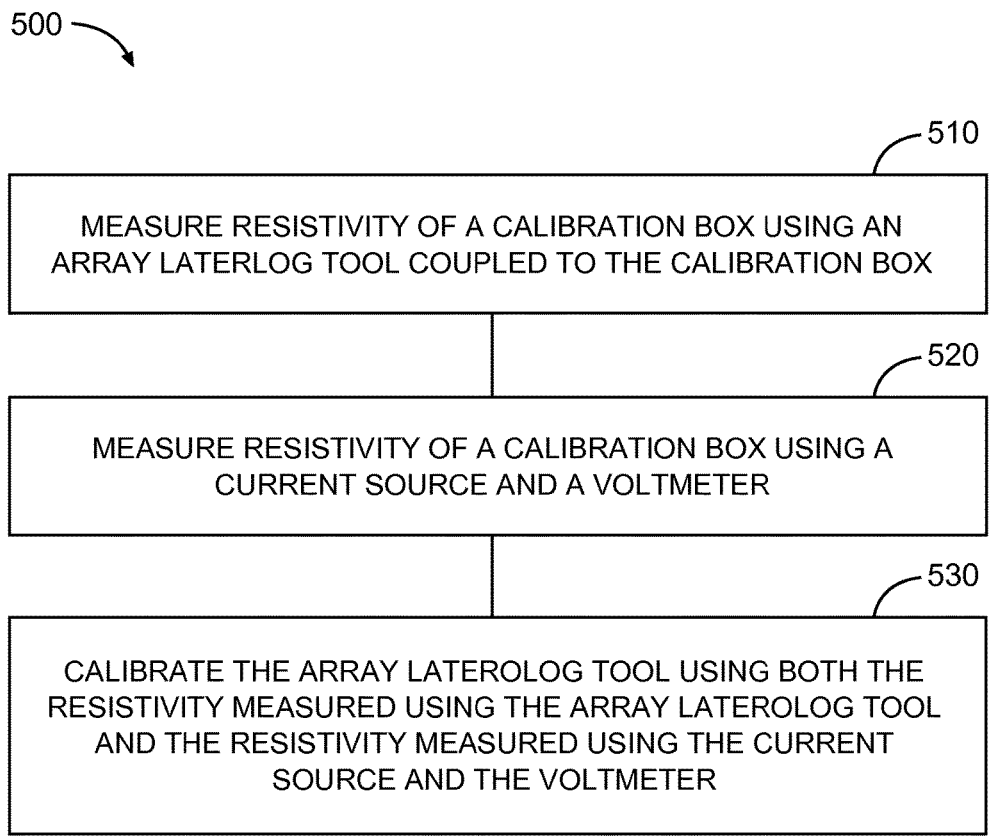
FIG. 5 is a flow diagram of features of an example method of calibration, in accordance with various embodiments.

FIG. 5 is a flow diagram of features of an embodiment of an example method 500 of calibration. At 510, resistivity of a calibration box is measured using an array laterolog tool coupled to the calibration box. At 520, resistivity of the calibration box is measured using a current source and a voltmeter. At 530, the array laterolog tool is calibrated using both the resistivity measured using the array laterolog tool and the resistivity measured using the current source and the voltmeter.

Method 500 can include operating the calibrated array laterolog tool downhole in measurement of formation resistivity; measuring resistivity of the calibration box using the calibrated array laterolog tool coupled to the calibration box after operating the calibrated array laterolog downhole; and re-calibrating the array laterolog tool using both the resistivity measured using the array laterolog tool after operating the calibrate array laterolog downhole and the resistivity measured using the current source and the voltmeter. The array laterolog tool can be operated downhole at a drilling site in a wireline logging tool or a MWD tool such as a LWD tool.

Methods similar to or identical to method 500, when measuring resistivity of the calibration box using the current source and the voltmeter, can include measuring differential voltages, measuring absolute voltages with respect to a reference, or measuring both differential voltages and absolute voltages with respect to a reference for multiple generations of current, providing a set of unfocused voltages and currents; generating a set of focused voltages and currents from the unfocused voltages and currents; and calculating apparent resistivities using the focused voltages and currents. Measuring differential voltages can include: generating current between a port mapped to a central electrode of the array laterolog tool and a port mapped to a selected excitation electrode of a plurality of excitation ports of the array laterolog tool; measuring differential voltage between a pair of ports mapped to a monitor electrode pair of the array laterolog tool, for each pair of ports mapped to a monitor electrode pair of a plurality of monitor electrode pairs of the array laterolog tool; repeating generation of current with the port mapped to the central electrode replaced with a port mapped to an excitation electrode other than the port mapped to the selected excitation electrode, for each port mapped to an excitation port of the plurality of excitation ports; and measuring differential voltage between each pair of ports mapped to respective monitor electrode pairs of the array laterolog tool, for each repeating of the generation of current. Measuring absolute voltages with respect to a reference can include: generating current between a port mapped to a central electrode of the array laterolog tool and a port mapped to a selected excitation electrode of a plurality of excitation ports of the array laterolog tool; measuring voltage between a port mapped to a monitor electrode of the array laterolog tool and the reference, for each port mapped to a monitor electrode of a plurality of monitor electrodes of the array laterolog tool for the generated current between the port mapped to the central electrode and the port mapped to a selected excitation electrode; repeating the generation of current with the port mapped to the central electrode replaced with a port mapped to an excitation electrode other than the port mapped to the selected excitation electrode, for each port mapped to an excitation port of the plurality of excitation ports; and measuring voltage between the reference and each port mapped to a respective monitor electrode of the array laterolog tool, for each repeating of the generation of current.

Methods similar to or identical to method 500 and expansions of these methods, when measuring resistivity of the calibration box using the current source and the voltmeter, can include measuring apparent resistivity. Such methods can further include: measuring apparent resistivities of two or more additional calibration boxes using the current source and the voltmeter; and determining a voltage offset, a current offset, and a calibration constant from the apparent resistivities measured from the calibration box and the two or more additional calibration boxes. Such methods can include measuring the apparent resistivities of the calibration boxes using the current source and the voltmeter for each of a number of operational modes of the array laterolog tool and calculating voltage offset, a current offset, and a calibration constant for each of the number of operational modes.

Figure 6:
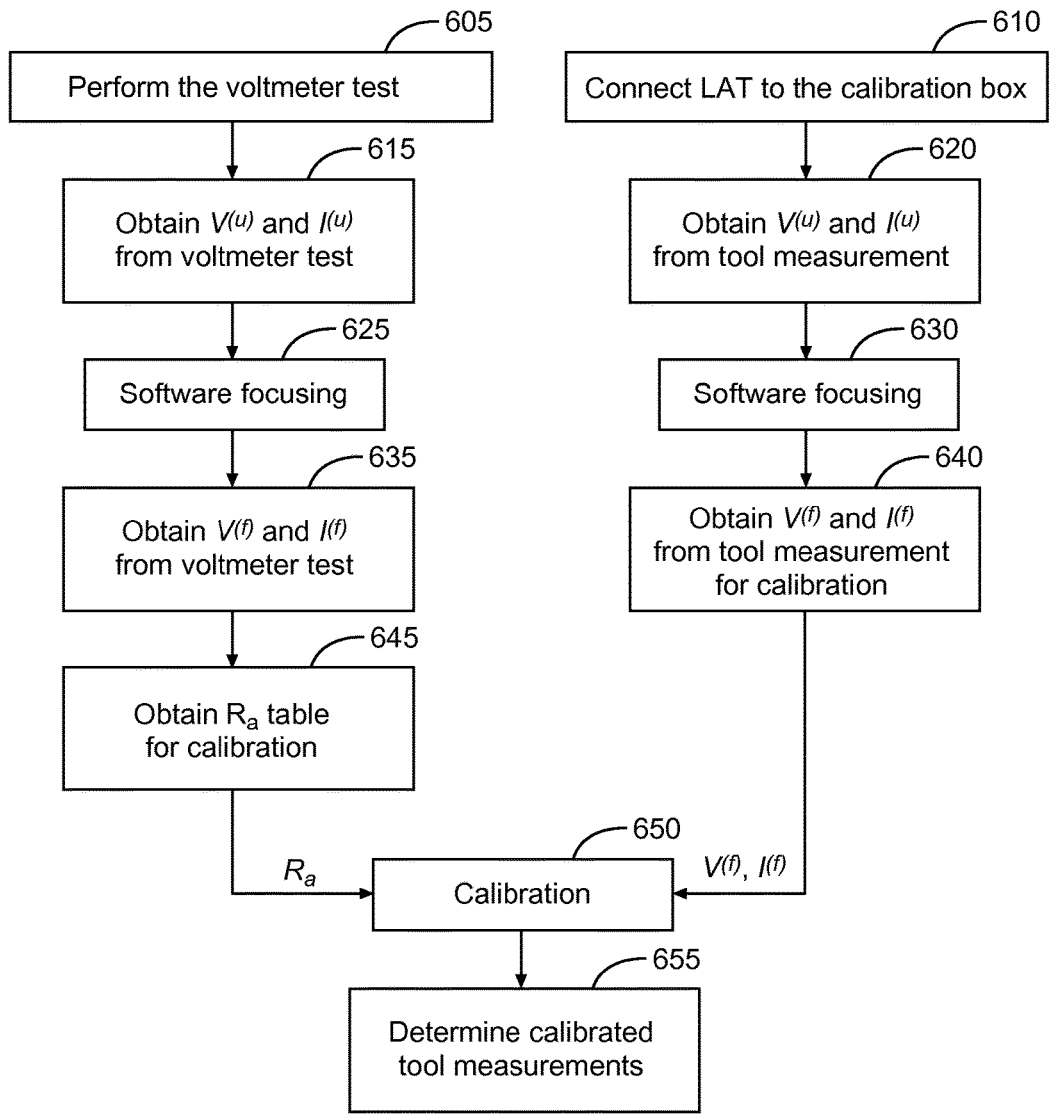
FIG. 6 is a workflow of an example calibration process for a calibrated array laterolog tool measurement, in accordance with various embodiments.

FIG. 6 is a workflow of an embodiment of an example calibration process for a calibrated LAT measurement. At 610, a LAT is connected to a calibration box. At 620, $V^{(u)}$ and $I^{(u)}$ that correspond to the calibration box are obtained from the tool measurement. At 630, software focusing is performed on the $V^{(u)}$ and $I^{(u)}$ from the tool measurement. At 640, $V^{(f)}$ and $I^{(f)}$ are obtained from the software focusing on the LAT measurement for calibration. At 605, a voltmeter test is performed. For example, a voltmeter test may be performed as described above. At 615, $V^{(u)}$ and $I^{(u)}$ that correspond to the calibration box are obtained from the voltmeter test. At 625, software focusing is performed on the $V^{(u)}$ and $I^{(u)}$ from the voltmeter test. At 635, $V^{(f)}$ and $I^{(f)}$ are obtained from the software focusing on the voltmeter test data. The actions at 605, 615, 625, and 635 may be conducted in a manner similar to or identical to procedures associated with FIGS. 3 and 4, as taught herein. At 645, an apparent resistivity (Ra) table is determined for calibration. At 650, calibration is conducted. The calibration can use the results obtained at 645 and at 640. At 655, calibrated tool measurements are determined on downhole data. The downhole data may be acquired from operation of a wireline logging tool or a MWD tool such as a LWD tool.

The calibration methods taught herein are robust and reliable. The methods take into account all of the non-ideal effects, including soldering effects, coupling effects and error tolerances of resistors in the calibration boxes. They provide more precise calibration than conventional calibration. Though the discussions above dealt with LATs, embodiments of the calibration method are applicable to other galvanic tools.

One of more portions of the features associated with FIG. 5 and/or FIG. 6 may be combined to generate additional embodiments to calibrate a galvanic tool. In addition, a machine-readable storage device can have instructions stored thereon, which, when performed by a machine, cause the machine to perform operations, the operations comprising a method associated with any of FIGS. 1-6 or combinations thereof. Further, a machine-readable storage device, herein, is a physical device, which is a non-transitory device, that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

In various embodiments, a system comprises a processor unit and a memory unit operatively coupled to the processor unit, where the memory unit has instructions stored thereon, which, when executed by the processor unit, cause the system to perform operations according to a method associated with any of FIGS. 1-6 or combinations thereof. The system can include a galvanic tool. The galvanic tool may be a LAT. Various components and/or features associated with the system can include a number of additional structures or structures arranged to conduct additional actions related to a galvanic tool and/or calibration of the galvanic tool.

In various embodiments, a system, labelled as system 1 for this discussion, can comprise: a calibration unit including one or more calibration boxes correlated to an array laterolog tool, the array laterolog tool operable downhole at a drilling site and capable of coupling to the one or more calibration boxes to provide array laterolog tool data to measure resistivity of the respective calibration box to which it is coupled; a current source; a voltmeter operable in conjunction with the current source and the voltmeter to provide measurement data to determine resistivity of the respective calibration box; a memory arranged to store the measurement data and the array laterolog tool data, the memory being a non-transitory machine-readable storage device having instructions stored thereon, which, when performed by the system, cause the system to perform operations; and a processor operatively coupled to the memory to execute the instructions and arranged to control calibration of the array laterolog tool from use of both the array laterolog tool data and the measurement data. The array laterolog tool can be operated downhole at the drilling site in a wireline logging tool or a MWD tool such as a LWD tool.

Systems similar to or identical to systems that perform processed as taught herein can be implemented or applied in number of situations using a variety of components. For example, a system labelled as system 2 similar to or identical to system 1, can have operations where the operations include: operation of the calibrated array laterolog tool downhole in measurement of formation resistivity; measurement of resistivity of a first calibration box of the one or more calibration boxes from use of the calibrated array laterolog tool coupled to the first calibration box after operating the calibrated array laterolog downhole; and re-calibration of the array laterolog tool from use of both the resistivity measured from use of the array laterolog tool after operating the calibrated array laterolog downhole and the measurement data.

A system labelled as system 3 similar to or identical to system 1, can have operations where the operations include measurement of resistivity of the respective calibration box from use of the current source and the voltmeter that includes: measurements of differential voltages, measurements of absolute voltages with respect to a reference, or measurements of both differential voltages and absolute voltages with respect to a reference for multiple generations of current, such that a set of unfocused voltages and currents is provided; generation of a set of focused voltages and currents from the unfocused voltages and currents; and calculation of apparent resistivities from the focused voltages and currents.

A system labelled as system 4 similar to or identical to system 3, can be arranged wherein measurements of differential voltages can include: generation of current between a port mapped to a central electrode of the array laterolog tool and a port mapped to a selected excitation electrode of a plurality of excitation ports of the array laterolog tool; measurement of differential voltage between a pair of ports mapped to a monitor electrode pair of the array laterolog tool, for each pair of ports mapped to a monitor electrode pair of a plurality of monitor electrode pairs of the array laterolog tool; repetition of generation of current with the port mapped to the central electrode replaced with a port mapped to an excitation electrode other than the port mapped to the selected excitation electrode, for each port mapped to an excitation port of the plurality of excitation ports; and measurement of differential voltage between each pair of ports mapped to respective monitor electrode pairs of the array laterolog tool, for each repetition of the generation of current.

A system labelled as system 5 similar to or identical to system 3, can be arranged wherein measurements of absolute voltages with respect to a reference can include: generation of current between a port mapped to a central electrode of the array laterolog tool and a port mapped to a selected excitation electrode of a plurality of excitation ports of the array laterolog tool; measurement of voltage between a port mapped to a monitor electrode of the array laterolog tool and the reference, for each port mapped to a monitor electrode of a plurality of monitor electrodes of the array laterolog tool for the generated current between the port mapped to the central electrode and the port mapped to a selected excitation electrode; repetition of the generation of current with the port mapped to the central electrode replaced with a port mapped to an excitation electrode other than the port mapped to the selected excitation electrode, for each port mapped to an excitation port of the plurality of excitation ports; and measurement of voltage between the reference and each port mapped to a respective monitor electrode of the array laterolog tool, for each repetition of the generation of current.

A system labelled as system 6 similar to or identical to any of systems 1 to 5, can be arranged wherein the operations can include operation of the voltmeter in conjunction with the current source to provide measurement data to determine apparent resistivity of the respective calibration box and to measure apparent resistivities of two or more additional calibration boxes from use of the current source and the voltmeter; and determine a voltage offset, a current offset, and a calibration constant from the apparent resistivities measured from the respective calibration box and the two or more additional calibration boxes.

A system labelled as system 7 similar to or identical to system 6, can be arranged wherein the operations include measurement of the apparent resistivities of the calibration boxes from use of the current source and the voltmeter for each of a number of operational modes of the array laterolog tool and calculation of a voltage offset, a current offset, and a calibration constant for each of the number of operational modes. Features of any of system labelled 1-7 or other combinations of features, as taught herein, may be appropriately combined into a system according to the teachings herein.

Figure 7:
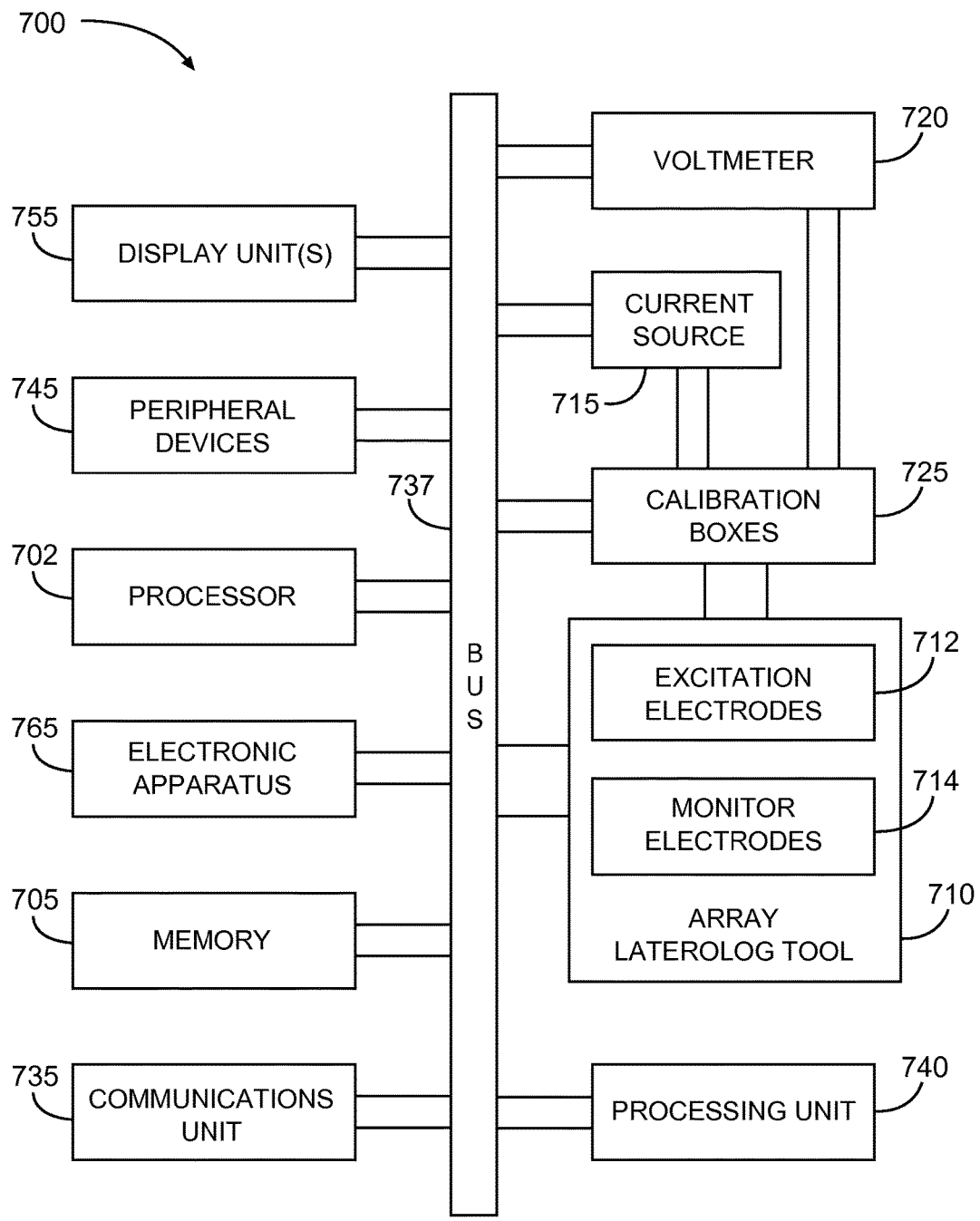
FIG. 7 is a block diagram of features of a system operable to calibrate a galvanic tool, in accordance with various embodiments.

FIG. 7 is a block diagram of features of an example embodiment of a system 700 operable to calibrate a galvanic tool, as described herein or in a similar manner. The system 700 can include the galvanic tool 710, which can be a LAT as shown in FIG. 7 having excitation electrodes 712 and monitor electrodes 714. The system 700 can be configured to operate in accordance with the teachings herein.

The system 700 can include a processor 702, a memory 705, an electronic apparatus 765, and a communications unit 735. The processor 702 can be realized as a processor or a group of processors that may operate independently depending on an assigned function. The memory 705 can be structured to include a database. One or more of the processor 702, the memory 705, and the communications unit 735 can be arranged to operate to control operation of the excitation electrodes 712 and to perform operations on the signals collected by the monitor electrodes 714 to calibrate the LAT 710. A processor 702, optionally structured as a dedicated unit to control calibration of the LAT 710, may be implemented as a single unit or distributed among the components of the system 700 including electronic apparatus 765. The processor 702 and the memory 705 can operate to control activation of a selected excitation electrode of excitation electrodes 712 to generate a current. The processor 702 and the memory 705 can operate to control selection of the monitor electrodes 714 in the LAT 710 and to manage processing schemes. The processor 702, the memory 705, and other components of the system 700 can be structured, for example, to operate similar to or identical to the processing components discussed herein or similar to or identical to any of methods discussed herein.

The system 700 can also include a bus 727, where the bus 727 provides electrical conductivity among the components of the system 700. The bus 727 can include an address bus, a data bus, and a control bus, each independently configured or in an integrated format. The bus 727 can be realized using a number of different communication mediums that allows for the distribution of components of the system 700. Use of the bus 727 can be regulated by the processor 702. Bus 727 can include a communications network.

The LAT 710 can be coupled directly to a calibration box 725 during a calibration procedure as taught herein. The LAT 710 can be disconnected from the calibration box 725 such that a current 715 and a voltmeter 720 can be coupled directly to the calibration box 725 at appropriate times during the calibration procedure. Alternatively, a switch may be used to connect the calibration box 725 to the LAT 710 or to the current source 715 and the voltmeter 720 at appropriate times. Different calibration boxes may be disposed in 700 as calibration box 725, having a different resistivity network to simulate different formation resistivities. The calibration boxes 725 can be disposed in the system 700 with a switch to select the calibration box to be used. Alternatively, connection to calibration boxes can be implemented using bus 737 appropriately calibrated.

In various embodiments, the peripheral devices 745 can include additional storage memory and other control devices, such as various switches, which may operate in conjunction with the processor 702 and the memory unit 730. The system 700 can include display unit(s) 755, which can be used with instructions stored in the memory unit 730 to implement a user interface to display results of a calibration procedure and/or monitor the operation of the galvanic tool 710 and/or components distributed within the system 700.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method for calibrating an array laterolog tool, said method comprising:
   measuring resistivity of a calibration box using an array laterolog tool coupled to the calibration box;
   measuring resistivity of the calibration box using a current source and a voltmeter; and
   calibrating the array laterolog tool using both the resistivity measured using the array laterolog tool and the resistivity measured using the current source and the voltmeter.

2. The method of claim 1, wherein the method includes:
   operating the calibrated array laterolog tool downhole in measurement of formation resistivity;
   measuring resistivity of the calibration box using the calibrated array laterolog tool coupled to the calibration box after operating the calibrated array laterolog downhole; and
   re-calibrating the array laterolog tool using both the resistivity measured using the array laterolog tool after operating the calibrate array laterolog downhole and the resistivity measured using the current source and the voltmeter.

3. The method of claim 1, wherein the measuring resistivity of the calibration box using the current source and the voltmeter includes:
   measuring differential voltages, measuring absolute voltages with respect to a reference, or measuring both differential voltages and absolute voltages with respect to a reference for multiple generations of current, providing a set of unfocused voltages and currents;
   generating a set of focused voltages and currents from the unfocused voltages and currents; and
   calculating apparent resistivities using the focused voltages and currents.

4. The method of claim 3, wherein the measuring differential voltages includes:
   generating current between a port mapped to a central electrode of the array laterolog tool and a port mapped to a selected excitation electrode of a plurality of excitation ports of the array laterolog tool;
   measuring differential voltage between a pair of ports mapped to a monitor electrode pair of the array laterolog tool, for each pair of ports mapped to a monitor electrode pair of a plurality of monitor electrode pairs of the array laterolog tool;
   repeating generation of current with the port mapped to the central electrode replaced with a port mapped to an excitation electrode other than the port mapped to the selected excitation electrode, for each port mapped to an excitation port of the plurality of excitation ports; and
   measuring differential voltage between each pair of ports mapped to respective monitor electrode pairs of the array laterolog tool, for each repeating of the generation of current.

5. The method of claim 3, wherein the measuring absolute voltages with respect to the reference includes:
   generating current between a port mapped to a central electrode of the array laterolog tool and a port mapped to a selected excitation electrode of a plurality of excitation ports of the array laterolog tool;
   measuring voltage between a port mapped to a monitor electrode of the array laterolog tool and the reference, for each port mapped to a monitor electrode of a plurality of monitor electrodes of the array laterolog tool for the generated current between the port mapped to the central electrode and the port mapped to a selected excitation electrode;
   repeating the generation of current with the port mapped to the central electrode replaced with a port mapped to an excitation electrode other than the port mapped to the selected excitation electrode, for each port mapped to an excitation port of the plurality of excitation ports; and
   measuring voltage between the reference and each port mapped to a respective monitor electrode of the array laterolog tool, for each repeating of the generation of current.

6. The method of claim 1, wherein the measuring resistivity of the calibration box using the current source and the voltmeter includes measuring apparent resistivity and the method further includes:
   measuring apparent resistivities of two or more additional calibration boxes using the current source and the voltmeter; and
   determining a voltage offset, a current offset, and a calibration constant from the apparent resistivities measured from the calibration box and the two or more additional calibration boxes.

7. The method of claim 6, wherein the method further includes measuring the apparent resistivities of the calibration boxes using the current source and the voltmeter for each of a number of operational modes of the array laterolog tool and calculating a voltage offset, a current offset, and a calibration constant for each of the number of operational modes.

8. A non-transitory machine-readable storage device having instructions stored thereon, which, when performed by a process of a machine, cause the machine to perform operations for calibrating an array laterolog tool, the operations comprising:
   measuring resistivity of a calibration box using an array laterolog tool coupled to the calibration box;
   measuring resistivity of the calibration box using a current source and a voltmeter; and
   calibrating the array laterolog tool using both the resistivity measured using the array laterolog tool and the resistivity measured using the current source and the voltmeter.

9. The non-transitory machine-readable storage device of claim 8, wherein the operations includes:
   operating the calibrated array laterolog tool downhole in measurement of formation resistivity;
   measuring resistivity of the calibration box using the calibrated array laterolog tool coupled to the calibration box after operating the calibrated array laterolog downhole; and
   re-calibrating the array laterolog tool using both the resistivity measured using the array laterolog tool after operating the calibrated array laterolog downhole and the resistivity measured using the current source and the voltmeter.

10. The non-transitory machine-readable storage device of claim 8, wherein the measuring resistivity of the calibration box using the current source and the voltmeter includes:
    measuring differential voltages, measuring absolute voltages with respect to a reference, or measuring both differential voltages and absolute voltages with respect to a reference for multiple generations of current, providing a set of unfocused voltages and currents;

generating a set of focused voltages and currents from the unfocused voltages and currents; and calculating apparent resistivities using the focused voltages and currents.

11. The non-transitory machine-readable storage device of claim 10, wherein the measuring differential voltages includes:

generating current between a port mapped to a central electrode of the array laterolog tool and a port mapped to a selected excitation electrode of a plurality of excitation ports of the array laterolog tool;

measuring differential voltage between a pair of ports mapped to a monitor electrode pair of the array laterolog tool, for each pair of ports mapped to a monitor electrode pair of a plurality of monitor electrode pairs of the array laterolog tool;

repeating generation of current with the port mapped to the central electrode replaced with a port mapped to an excitation electrode other than the port mapped to the selected excitation electrode, for each port mapped to an excitation port of the plurality of excitation ports; and measuring differential voltage between each pair of ports mapped to respective monitor electrode pairs of the array laterolog tool, for each repeating of the generation of current.

12. The non-transitory machine-readable storage device of claim 10, wherein the measuring absolute voltages with respect to the reference includes:

generating current between a port mapped to a central electrode of the array laterolog tool and a port mapped to a selected excitation electrode of a plurality of excitation ports of the array laterolog tool;

measuring voltage between a port mapped to a monitor electrode of the array laterolog tool and the reference, for each port mapped to a monitor electrode of a plurality of monitor electrodes of the array laterolog tool for the generated current between the port mapped to the central electrode and the port mapped to a selected excitation electrode;

repeating the generation of current with the port mapped to the central electrode replaced with a port mapped to an excitation electrode other than the port mapped to the selected excitation electrode, for each port mapped to an excitation port of the plurality of excitation ports; and measuring voltage between the reference and each port mapped to a respective monitor electrode of the array laterolog tool, for each repeating of the generation of current.

13. The non-transitory machine-readable storage device of claim 8, wherein the measuring resistivity of the calibration box using the current source and the voltmeter includes measuring apparent resistivity and the method further includes:

measuring apparent resistivities of two or more additional calibration boxes using the current source and the voltmeter; and determining a voltage offset, a current offset, and a calibration constant from the apparent resistivities measured from the calibration box and the two or more additional calibration boxes.

14. The non-transitory machine-readable storage device of claim 12, wherein the operations further include measuring the apparent resistivities of the calibration boxes using the current source and the voltmeter for each of a number of operational modes of the array laterolog tool and calculating a voltage offset, a current offset, and a calibration constant for each of the number of operational modes.

15. A system comprising:

a calibration unit including one or more calibration boxes correlated to an array laterolog tool, the array laterolog tool operable downhole at a drilling site and capable of coupling to the one or more calibration boxes to provide array laterolog tool data to measure resistivity of the respective calibration box to which it is coupled;

a current source;

a voltmeter operable in conjunction with the current source and the voltmeter to provide measurement data to determine resistivity of the respective calibration box;

a memory arranged to store the measurement data and the array laterolog tool data, the memory being a non-transitory machine-readable storage device having instructions stored thereon, which, when performed by the system, cause the system to perform operations; and a processor operatively coupled to the memory to execute the instructions and arranged to control calibration of the array laterolog tool from use of both the array laterolog tool data and the measurement data.

16. The system of claim 15, wherein the operations include:

operation of the calibrated array laterolog tool downhole in measurement of formation resistivity;

measurement of resistivity of a first calibration box of the one or more calibration boxes from use of the calibrated array laterolog tool coupled to the first calibration box after operating the calibrated array laterolog downhole; and re-calibration of the array laterolog tool from use of both the resistivity measured from use of the array laterolog tool after operating the calibrated array laterolog downhole and the measurement data.

17. The system of claim 15, wherein the operations include the measurement of resistivity of the respective calibration box from use of the current source and the voltmeter that includes:

measurements of differential voltages, measurements of absolute voltages with respect to a reference, or measurements of both differential voltages and absolute voltages with respect to a reference for multiple generations of current, such that a set of unfocused voltages and currents is provided;

generation of a set of focused voltages and currents from the unfocused voltages and currents; and calculation of apparent resistivities from the focused voltages and currents.

18. The system of claim 17, wherein the measurements of differential voltages include:

generation of current between a port mapped to a central electrode of the array laterolog tool and a port mapped to a selected excitation electrode of a plurality of excitation ports of the array laterolog tool;

measurement of differential voltage between a pair of ports mapped to a monitor electrode pair of the array laterolog tool, for each pair of ports mapped to a monitor electrode pair of a plurality of monitor electrode pairs of the array laterolog tool;

repetition of generation of current with the port mapped to the central electrode replaced with a port mapped to an excitation electrode other than the port mapped to the selected excitation electrode, for each port mapped to an excitation port of the plurality of excitation ports; and measurement of differential voltage between each pair of ports mapped to respective monitor electrode pairs of the array laterolog tool, for each repetition of the generation of current.

19. The system of claim 17, wherein the measurements of absolute voltages with respect to a reference includes:
generation of current between a port mapped to a central electrode of the array laterolog tool and a port mapped to a selected excitation electrode of a plurality of excitation ports of the array laterolog tool;
measurement of voltage between a port mapped to a monitor electrode of the array laterolog tool and the reference, for each port mapped to a monitor electrode of a plurality of monitor electrodes of the array laterolog tool for the generated current between the port mapped to the central electrode and the port mapped to a selected excitation electrode;
repetition of the generation of current with the port mapped to the central electrode replaced with a port mapped to an excitation electrode other than the port mapped to the selected excitation electrode, for each port mapped to an excitation port of the plurality of excitation ports; and
measurement of voltage between the reference and each port mapped to a respective monitor electrode of the array laterolog tool, for each repetition of the generation of current.

20. The system of claim 15, wherein the operations include operation of the voltmeter in conjunction with the current source to provide measurement data to determine apparent resistivity of the respective calibration box and to:
measure apparent resistivities of two or more additional calibration boxes from use of the current source and the voltmeter; and
determine a voltage offset, a current offset, and a calibration constant from the apparent resistivities measured from the respective calibration box and the two or more additional calibration boxes.

21. The system of claim 20, wherein the operations further include the measurement of the apparent resistivities of the calibration boxes from use of the current source and the voltmeter for each of a number of operational modes of the array laterolog tool and calculation of a voltage offset, a current offset, and a calibration constant for each of the number of operational modes.

* * * * *